United States Patent
Song et al.

(10) Patent No.: US 8,880,331 B1
(45) Date of Patent: Nov. 4, 2014

(54) METHOD FOR PROVIDING INTEGRATED INFORMATION TO HEAD UNIT OF VEHICLE BY USING TEMPLATE-BASED UI, AND HEAD UNIT AND COMPUTER-READABLE RECODING MEDIA USING THE SAME

(71) Applicant: Obigo Inc., Gyeonggi-do (KR)

(72) Inventors: Hyung Woon Song, Seoul (KR); Shin Gyu Kang, Seoul (KR); Won Hui Kang, Seoul (KR)

(73) Assignee: Obigo Inc., Gyeonggi-do (KR)

( * ) Notice: Subject to any disclaimer, the term of this patent is extended or adjusted under 35 U.S.C. 154(b) by 0 days.

(21) Appl. No.: 14/283,645

(22) Filed: May 21, 2014

(30) Foreign Application Priority Data

Mar. 31, 2014 (KR) .......................... 10-2014-0038120

(51) Int. Cl.
*G01C 21/28* (2006.01)
*G06F 7/00* (2006.01)
*G01C 21/00* (2006.01)

(52) U.S. Cl.
CPC .............. *G06F 7/00* (2013.01); *G01C 21/005* (2013.01)
USPC ........................................................ 701/400

(58) Field of Classification Search
USPC ........................................................ 701/400
See application file for complete search history.

(56) References Cited

U.S. PATENT DOCUMENTS

| | | | |
|---|---|---|---|
| 6,587,781 B2* | 7/2003 | Feldman et al. | 701/117 |
| 7,536,256 B2* | 5/2009 | Kelley et al. | 701/425 |
| 8,473,152 B2* | 6/2013 | Zilka | 701/36 |
| 2003/0114206 A1* | 6/2003 | Timothy et al. | 455/575 |
| 2008/0076470 A1* | 3/2008 | Ueda et al. | 455/556.1 |
| 2008/0215240 A1* | 9/2008 | Howard et al. | 701/213 |
| 2009/0292587 A1* | 11/2009 | Fitzgerald | 705/10 |
| 2010/0036600 A1* | 2/2010 | Shinmyoh et al. | 701/200 |
| 2010/0094546 A1* | 4/2010 | Ujino | 701/208 |
| 2011/0202591 A1* | 8/2011 | Reis et al. | 709/203 |
| 2012/0046864 A1* | 2/2012 | Zilka | 701/533 |
| 2013/0117021 A1* | 5/2013 | James | 704/235 |

FOREIGN PATENT DOCUMENTS

KR 10-2013-0139623 12/2013

* cited by examiner

*Primary Examiner* — Shelley Chen
(74) *Attorney, Agent, or Firm* — Husch Blackwell LLP

(57) ABSTRACT

The present invention relates to a method for integrating information on external application with information on internal application. The method includes steps of: (a) classifying information inputted from internal application and external application into either common information or specialized information; (b) deciding whether common information of the external application should be matched with that of the internal application by referring to a matching algorithm and then matching the common information of the external application with that of the internal application, if necessary, and matching the specialized information of the external application with that of the internal application; and (c) providing common information at states of being matched or unmatched according to the matching algorithm through the template and the matched specialized information through the template.

20 Claims, 7 Drawing Sheets

METHOD FOR PROVIDING INTEGRATED INFORMATION TO HEAD UNIT OF VEHICLE BY USING TEMPLATE-BASED UI, AND HEAD UNIT AND COMPUTER-READABLE RECODING MEDIA USING THE SAME

CROSS REFERENCE TO RELATED APPLICATION

This application claims priority to and incorporates herein by reference all disclosure in Korean Patent Application No. 10-2014-0038120 filed Mar. 31, 2014.

FIELD OF THE INVENTION

The present invention relates to a method, the head unit and the computer-readable media for integrating information on external applications stored in a mobile terminal connected with a head unit of a vehicle with information on at least one internal application built in the head unit of the vehicle and providing the integrated information by using a template-based user interface; and more particularly, to the method, the head unit and the computer-readable media for classifying respective pieces of information inputted from at least one internal application belonging to a specific category among all the internal applications connected with a template of the head unit and information from one or more external applications belonging thereto among all the external applications connected therewith into either common information or specialized information, matching common information of the external applications belonging to the specific category with that of the internal application belonging thereto, if necessary, and matching specialized information of the external applications thereto with that of the internal application belonging thereto by referring to a matching algorithm under a matching method, if being selected among (i) a full coordination matching method for matching the common information of the external applications belonging to the specific category with that of the internal application belonging thereto and matching the specialized information of the external applications belonging thereto with that of the internal application belonging thereto, (ii) a partial coordination matching method for requesting information on a selection of a user of the vehicle to be inputted as a condition for matching the common information of the external applications belonging thereto with that of the internal application belonging thereto and matching the specialized information of the external applications belonging thereto with that of the internal application belonging thereto, and (iii) a no coordination matching method for not matching the common information of the external applications belonging thereto with that of the internal application belonging thereto and matching the specialized information of the external applications belonging thereto with that of the internal application belonging thereto, and providing common information at states of being matched or unmatched according to the selected matching algorithm through the template and the matched specialized information through the template.

BACKGROUND OF THE INVENTION

Information provided to the existing head unit was changed only when the information was updated and information reflecting the traffic conditions in a mobile terminal such as a smart phone is used when a vehicle is driven but it is not the information in the head unit built in the vehicle. Therefore, there were many inconveniences because the mobile terminal is not fixed when it is operated and services are not provided selectively depending on the driving conditions of the vehicle.

To solve the problems mentioned above, the conventional technologies such as a Korean Laid-Open Publication No. 10-2013-0139623 under the subject titled "Apparatus and Method for Providing Location-Based Information by Using Smart Phone" as illustrated in FIG. 7 related to provide location-based information in real time by connecting a smart phone with a device without a telematics function, but because information cannot be acquired from a variety of navigation applications, a lot of useful information cannot be acquired during the operation of the vehicle. So they had limits to improve user satisfaction.

Therefore, the inventor of the present invention intends to propose a technology of providing common and specialized information of at least one internal navigation application built in the head unit and that of one or more mobile terminals in connection with a template of the head unit in a variety of modes.

SUMMARY OF THE INVENTION

It is an object of the present invention to solve all the problems mentioned above.

It is another object of the present invention to integrate information acquired from applications of a mobile terminal (s) with information acquired from an internal application(s) built in the head unit through a template of a head unit while the information acquired from the internal application(s) are weighted to allow for accuracy of GPS and a variety of sensors mounted on a vehicle and provide the integrated information for a user with approximation to actual information according to a certain mode.

It is still another object of the present invention to provide optimized information fit for a driving condition of the vehicle or a purpose of a use of the application by referring to a certain matching method selected among a plurality of matching methods for matching information obtained from electronic devices of the vehicle and that inputted from applications of a mobile terminal(s).

In accordance with one aspect of the present invention, there is provided a method for integrating information on at least one external application stored in a mobile terminal connected with a head unit of a vehicle with information on at least one internal application built in the head unit of the vehicle and providing the integrated information by using a template-based user interface, including steps of: (a) classifying respective pieces of information inputted from at least one internal application belonging to a specific category among all the internal applications connected with a template of the head unit and information inputted from at least one external application belonging thereto among all the external applications connected therewith into either common information or specialized information; (b) deciding whether common information of the external application belonging to the specific category should be matched with that of the internal application belonging thereto by referring to a matching algorithm under a matching method, if being selected among (i) a full coordination matching method for matching the common information of the external application belonging to the specific category with that of the internal application belonging thereto and matching the specialized information of the external application belonging thereto with that of the internal application belonging thereto, (ii) a partial coordination matching method for requesting information on a selection of a user of the vehicle to be inputted as a condition for matching the common information of the external application belonging thereto with that of the internal application belonging thereto and matching the specialized information of the external application belonging thereto with that of the internal application belonging thereto, and (iii) a no coordination matching method for not matching the common information of the external application belonging thereto with that of the internal application belonging thereto and matching the specialized information of the external application belonging thereto with that of the internal application belonging thereto and matching the common information of the external application belonging thereto with that of the internal application belonging thereto, if necessary, and matching the specialized information of the external application belonging thereto with that of the internal application belonging thereto; and (c) providing common information at states of being matched or unmatched according to the matching algorithm through the template and the matched specialized information through the template.

In accordance with another aspect of the present invention, there is provided a head unit for integrating information on at least one external application stored in a mobile terminal with that on at least one built-in internal application, and providing the integrated information by using a template-based user interface, including: an application information classifying part for classifying respective pieces of information inputted from at least one internal application belonging to a specific category among all the internal applications connected with a template of the head unit and information inputted from at least one external application belonging thereto among all the external applications connected therewith into either common information or specialized information; a matching managing part for deciding whether common information of the external application belonging to the specific category should be matched with that of the internal application belonging thereto by referring to a matching algorithm under a matching method, if being selected among (i) a full coordination matching method for matching the common information of the external application belonging to the specific category with that of the internal application belonging thereto and matching the specialized information of the external application belonging thereto with that of the internal application belonging thereto, (ii) a partial coordination matching method for requesting information on a selection of a user of the vehicle to be inputted as a condition for matching the common information of the external application belonging thereto with that of the internal application belonging thereto and matching the specialized information of the external application belonging thereto with that of the internal application belonging thereto, and (iii) a no coordination matching method for not matching the common information of the external application belonging thereto with that of the internal application belonging thereto and matching the specialized information of the external application belonging thereto with that of the internal application belonging thereto and matching the common information of the external application belonging thereto with that of the internal application belonging thereto, if necessary, and matching the specialized information of the external application belonging thereto with that of the internal application belonging thereto; and a display managing part for providing common information at states of being matched or unmatched according to the matching algorithm through the template and the matched specialized information through the template.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
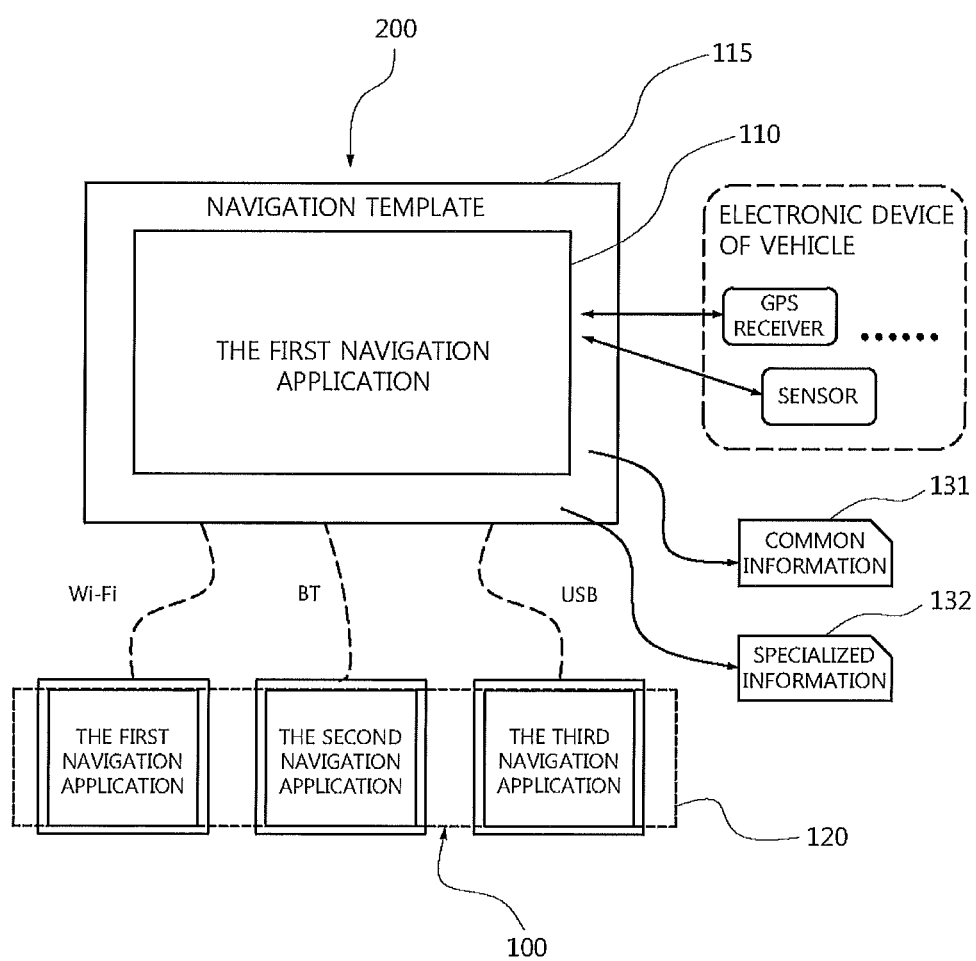
FIG. 1 is a drawing showing a method for integrating information on external applications stored in a mobile terminal connected with a head unit of a vehicle with that on an internal application built in the head unit thereof and providing the integrated information by using a template-based user interface (UI) in accordance with an example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 shows a method for integrating information on external applications stored in a mobile terminal connected with a head unit of a vehicle with that on an internal application built in the head unit thereof and providing the integrated information by using a template-based user interface (UI) in accordance with an example embodiment of the present invention.

In accordance with the present invention, information on applications acquired from mobile terminals may be integrated with that on internal applications built in the head unit, and then the integrated information may be applied to a template and provided to the head unit of the vehicle.

First of all, by referring to FIG. 1, the methods for integrating information on the external applications stored in a mobile terminal(s) connected with the head unit of the vehicle with that on the internal application built in the head unit thereof and providing the integrated information by using the template-based UI are explained as shown below. By reference, navigation applications are assumed for convenience of explanation but the present invention is not limited only to the navigation applications.

In accordance with one example embodiment of the present invention, a whole system may include a head unit 200 and one or more mobile terminals 100 in which a navigation application(s) 120 is included.

Figure 2:
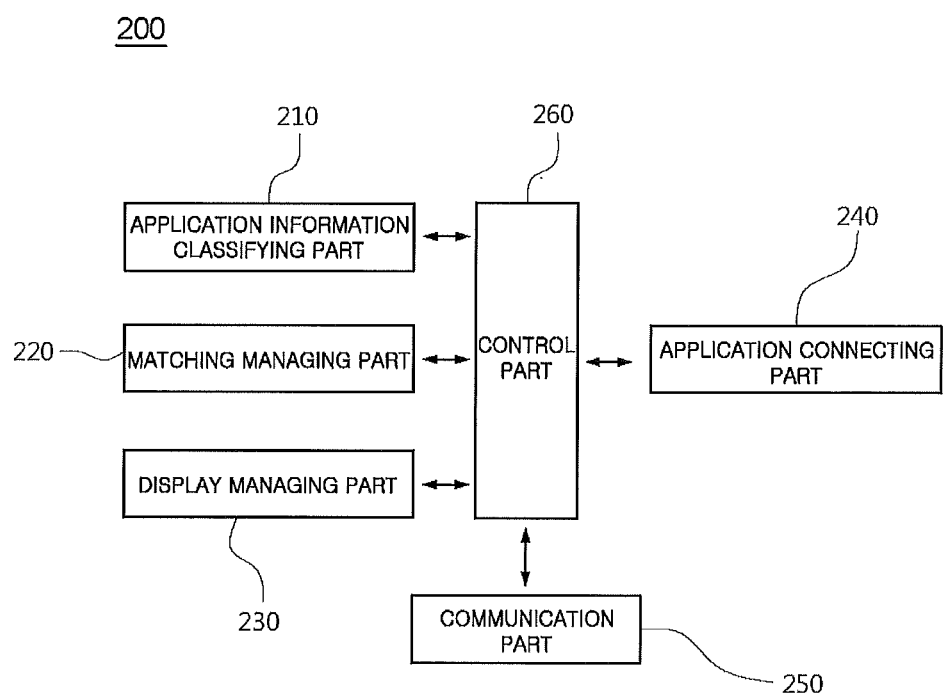
FIG. 2 is a block diagram illustrating a configuration of the head unit of the vehicle in accordance with an example embodiment of the present invention.
Figure 3:
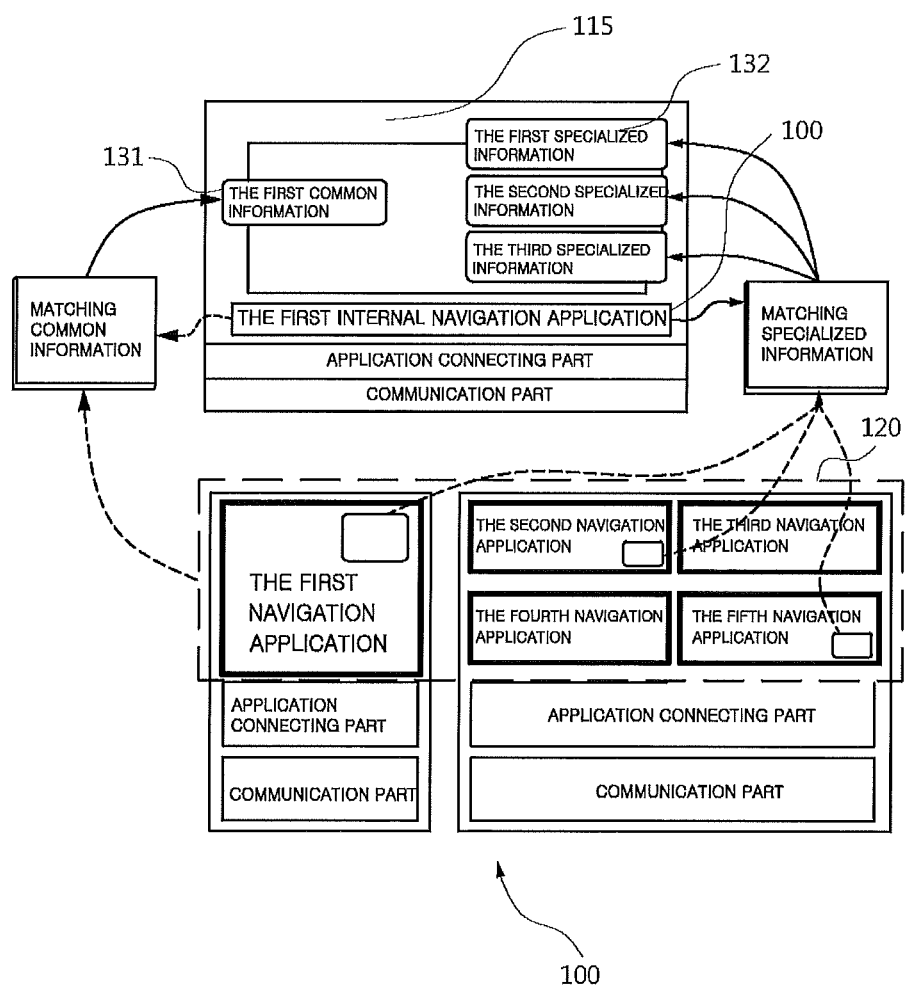
FIG. 3 is a diagram representing a method for integrating the information on external applications stored in a mobile terminal with that on the internal application and providing the integrated information by using a template-based UI in accordance with an example embodiment of the present invention.
Figure 4:
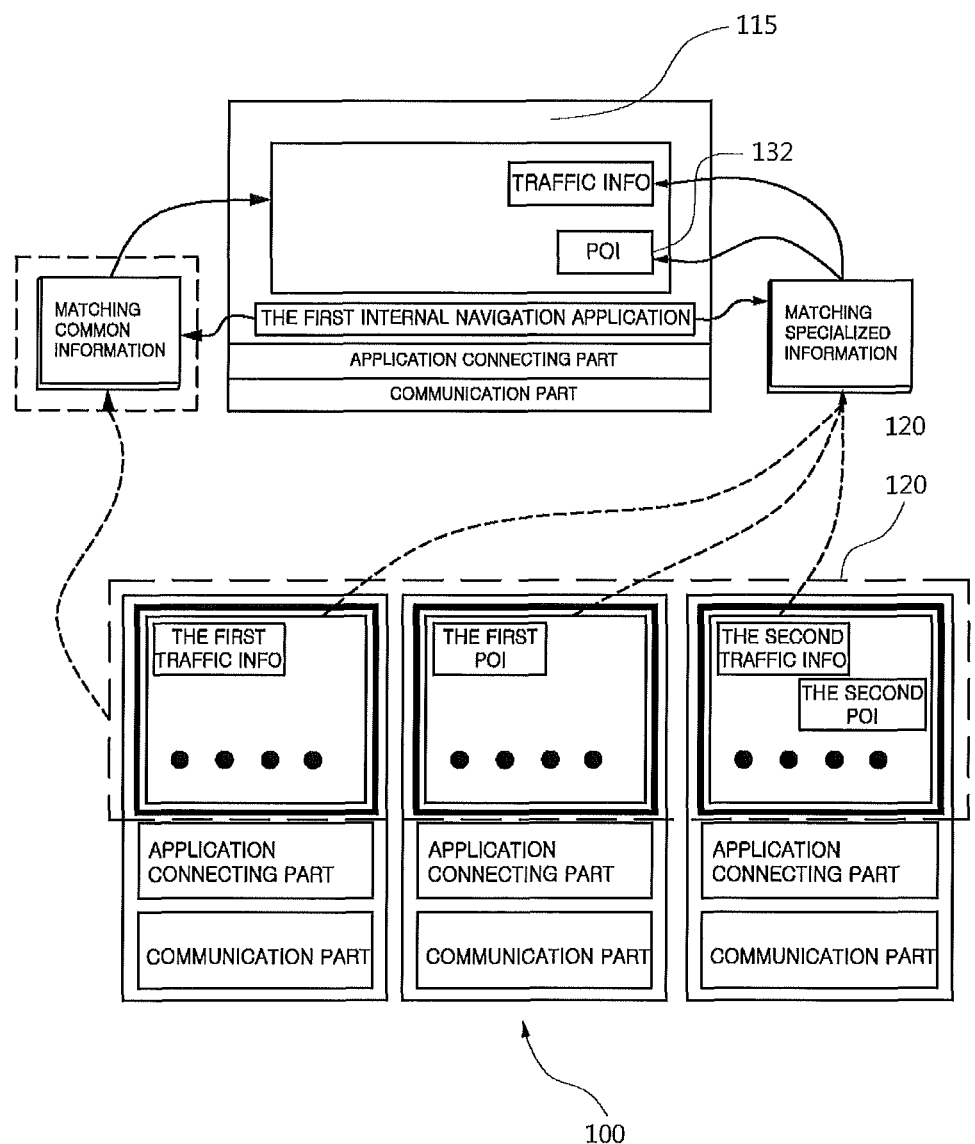
FIG. 4 is a diagram showing a method for integrating the information on external applications stored in a mobile terminal with that on internal application and providing the integrated information by using a template-based UI in accordance with an example embodiment of the present invention.

First of all, an application connecting part 240 (as illustrated in FIGS. 2 through 4) of the head unit 200 in accordance with one example embodiment of the present invention may perform a function of connecting applications executable in the mobile terminals 100 with a template 115 provided by the head unit 200 in connection with an application connecting part of the mobile terminal, providing information inputted from applications 120 executed in the mobile terminals 100 for the user through the template 115 of the head unit 200, and delivering control information inputted by the user through the template 115 of the head unit 200 to the applications executed in the mobile terminals 100 and then may allow the user to use the applications executed in the mobile terminals 100 through the template 115 of the head unit 200.

In an environment where the mobile terminals 100 such as a smart phone or a tablet PC are connected with the head unit 200, the head unit 200 acquires information of the applications 120 stored in the mobile terminal 100 at executable states. At the time, the applications may be navigation applications using GPS information, MP3 players with lists using music information, and other various categories of applications, but in the present invention, mainly navigation-related applications will be explained as examples for convenience of explanation.

For example, respective pieces of information inputted from an internal application 110 connected with the navigation template 115 of the head unit 200 (i.e., the application built in the head unit 200 itself) and that inputted from the external applications 120 connected with the template 115 of the head unit 200 are classified into either common information 131 or specialized information 132. Herein, the kinds of the common information may be preset by the head unit maker and those of the specialized information could be the other information excluding the common information from the information inputted from the internal application and the external applications, but it is not limited to this. By reference, the common information inputted from internal and external applications belonging to a navigation category may include information on direction, speed, distance, location, time, etc. and the specialized information inputted therefrom could also include information on traffic volume, GPS accuracy, lanes, map shapes, view modes, etc.

In addition, the head unit 200 may acquire selection information including information on a certain matching method which is automatically or manually selected among a full coordination matching method, a partial coordination matching method and a no coordination matching method. The full coordination, the partial coordination and the no coordination matching methods will be explained below in detail. By reference, if the selection information is acquired automatically, it could be assumed that one of the matching methods is selected automatically by referring to a policy preset by the vehicle maker and if it is acquired manually, it could also be introduced that a UI is provided for the driver to select one of the matching methods.

More specifically, the full coordination matching method means a method for matching common information of the external navigation application(s) with that of the internal navigation application(s) unconditionally and matching the specialized information of the external navigation application(s) with that of the internal navigation application(s) unconditionally. Besides, the partial coordination matching method could have a resemblance to the full coordination matching method in that it matches the specialized information of the external navigation application(s) with that of the internal navigation application(s) unconditionally, but there is a difference therebetween in that the partial coordination matching method does not match the common information of the external navigation application(s) with that of the internal navigation application(s) until a signal that the vehicle user wants to match the common information is inputted. Meanwhile, the no coordination matching method does not match the common information of the external navigation application(s) with that of the internal navigation application(s), but it could have a resemblance to the full coordination or the partial coordination matching method as well in that it matches the specialized information of the external application(s) belonging to the specific category with that of the internal application(s) belonging thereto unconditionally.

By referring to a matching algorithm corresponding to the certain matching method selected automatically or manually, the common information and/or the specialized information could be matched, i.e., integrated. Of course, matching the common information could be conducted in case the full coordination matching method is selected or in case the partial coordination matching method is selected under the condition that the signal that the vehicle user wants to match the common information is inputted. As such, the common information at a state of being matched or unmatched could be provided according to the matching algorithm through the navigation template 115 and the matched specialized information could be provided through the template 115.

If the common information is required to be matched, the multiple pieces of common information could be classified into types of detailed items and a task of classifying multiple pieces of specialized information by types of detailed items could be made in a similar method.

As such, after the classification is completed, by referring to difference values comparing respective figures of multiple pieces of common information classified in the same detailed item with a figure acquired through an electronic device(s) of the vehicle, a difference value comparing an average figure of the multiple pieces of common information classified in the same detailed item with the figure acquired therethrough or a variance value among figures of multiple pieces of common information classified in the same detailed item, if the difference value(s) or the variance value is less than a prefixed difference value or a prefixed variance value, average value of the multiple pieces of common information could be decided as the matched common information and if the difference value(s) or the variance value exceeds the prefixed difference value or the prefixed variance value, after a certain value which has the numerical value farthest from the figure acquired through the electronic device(s) of the vehicle is removed, a task of obtaining new average value of the multiple pieces of common information as shown above could be performed.

Besides, if the variance value among the values of the multiple pieces of specialized information classified into that in the same type (e.g., one pieces of information on traffic volume, GPS accuracy, lanes, map shapes, etc.) is less than a predetermined variance value, the average value of the multiple pieces of specialized information could be decided as the matched specialized information. Moreover, if the specialized information is matched by one of the matching methods of full coordination, partial coordination, and no coordination, after the multiple pieces of specialized information are filtered by using one or more filters for security, policy, subdivision, combination and classification, the multiple pieces of specialized information could be matched. This will be explained in detail later.

FIG. 2 is a block diagram illustrating a configuration of the head unit of the vehicle in accordance with an example embodiment of the present invention.

By referring to FIG. 2, the head unit 200 in accordance with one example embodiment of the present invention may include an application information classifying part 210, a matching managing part 220, a display managing part 230, the application connecting part 240, a communication part 250 and a control part 260. In accordance with one example embodiment of the present invention, at least some of the application information classifying part 210, the matching managing part 220, the display managing part 230, the application connecting part 240, the communication part 250 and the control part 260 may be included in the head unit 200 in a form of program module communicating with the mobile terminals 100. Such program modules may be included in the head unit 200 in a form of an operating system, an application program module, and other program modules or physically stored in various storage devices well known to those skilled in the art. In addition, they may be stored in a remote storage device capable of communicating with the head unit 200. The program modules may include but not be subject to a routine, a subroutine, a program, an object, a component, and a data structure for executing a specific operation or a type of specific abstract data that will be described in accordance with the present invention.

First, the application information classifying part 210 in accordance with one example embodiment of the present invention may classify respective pieces of information inputted from at least one internal application 110 belonging to a specific category (e.g., a navigation category) among internal applications connected with a template 115 of the head unit 200 and that inputted from at least one external application 120 belonging thereto among external applications connected with the template 115 of the head unit 200 into either the common information or the specialized information.

By referring to FIG. 3, the application connecting part 240 may perform a function of allowing event or content information generated from applications of the mobile terminals 100 (i.e., external applications) to be delivered to the template 115 of the head unit 200 and allowing event or control information generated or inputted through the template 115 of the head unit 200 to be delivered to the applications of the mobile terminals 100 (i.e., external applications). Thus, the template 115 of the head unit 200 and the applications of the mobile terminals 100 may share a software library required to operate.

Furthermore, the application connecting part 240 in accordance with the present invention may perform a function of allowing information on the internal application(s) built in the head unit 200 to be delivered to the template 115 of the head unit 200 and allowing the event or the control information generated or inputted through the template 115 of the head unit 200 to be delivered to the internal application(s).

Additionally, the matching managing part 220 may match the common information of the external application(s) belonging to the specific category with that of the internal application(s) belonging thereto, if necessary, and match the specialized information of the external application(s) thereto with that of the internal application(s) belonging thereto by referring to a matching algorithm under a matching method, if being selected among (i) a full coordination matching method for matching the common information of the external application(s) belonging to the specific category with that of the internal application(s) belonging thereto and matching the specialized information of the external application(s) belonging thereto with that of the internal application(s) belonging thereto, (ii) a partial coordination matching method for requesting information on a selection of a user of the vehicle to be inputted as a condition for matching the common information of the external application(s) belonging thereto with that of the internal application(s) belonging thereto and matching the specialized information of the external application(s) belonging thereto with that of the internal application (s) belonging thereto, and (iii) a no coordination matching method for not matching the common information of the external application(s) belonging thereto with that of the internal application(s) belonging thereto and matching the specialized information of the external application(s) belonging thereto with that of the internal application(s) belonging thereto.

Herein, the specific category referred to by the matching managing part 220 could be assumed as a navigation category, a music category, a video category, etc. and if the specific category is considered to be assumed as the navigation category, the common information could be information on direction, speed, distance, location, time, etc. and the specialized information could be information on traffic volume, GPS accuracy, lanes, map shapes, view modes, etc.

Next, the display managing part 230 could provide the common information at states of being matched or unmatched according to the selected matching algorithm through the template 115 and the matched specialized information therethrough.

As illustrated in FIG. 2, the communication part 250 performs a function of allowing the head unit 200 to communicate with an external system such as the mobile terminal.

In addition, the control part 260 as illustrated in FIG. 2 performs a function of controlling data flow among the application information classifying part 210, the matching managing part 220, the display managing part 230, the application connecting part 240, and the communication part 250. In other words, the control part 260 controls the flow of data from/to outside or between the component of the head unit 200, to thereby allow the application information classifying part 210, the matching managing part 220, the display managing part 230, the application connecting part 240, and the communication part 250 to perform their unique functions.

FIG. 3 represents a method for integrating the information on the external applications stored in the mobile terminals 100 with that on the internal application and providing the integrated information by using the template-based UI in accordance with an example embodiment of the present invention and it could be found that respective pieces of information acquired from the external applications 120 in the multiple mobile terminals 100 (as the case may be, multiple applications could be included in a certain mobile terminal) and respective pieces of information acquired from the internal application 110 could be divided into the common information 131 and the specialized information 132 and they are matched to be provided to the template 115.

More preferentially, the common information in accordance with one example embodiment of the present invention indicates information commonly inputted from the multiple applications, information defined by the maker of the head unit 200 of the vehicle, or information that could correspond with components included in the template 115 of the head unit 200 of the vehicle, as the case may be. For example, if the multiple applications are navigation applications, the common information could include information on direction, speed, distance, location, time, etc.

In accordance with one example embodiment of the present invention, the specialized information indicates the other information excluding the common information from the information inputted from the internal application and the external applications. For example, the specialized information may include information inputted differently from the multiple applications or information not defined by the maker of the head unit 200 of the vehicle, or information which does not correspond with components included in the template 115 of the head unit 200 of the vehicle. But the specialized information may also include information which correspond with components included in the template 115 as the case may be. For instance, if the multiple applications are the navigation applications, the specialized information may include information on traffic volume, GPS accuracy, lanes, map shapes, view modes, etc.

FIG. 4 shows a method for integrating the information on the external applications stored in multiple mobile terminals 100 with that on the internal application and providing the integrated information by using the template-based UI in accordance with an example embodiment of the present invention and it could be found that information acquired from a first internal navigation application and those acquired from external navigation applications 120 are matched by a matching managing part (non-illustrated) and then provided to the template 115.

More specifically, it could be found that common information could be matched or unmatched depending on a selected mode which is one of a full coordination matching mode, a partial coordination matching mode, and a no coordination matching mode as mentioned above and also could be matched by excluding or including part of the common information. At the time, the common information could be matched or unmatched based on information on a first internal navigation application. In detail, if it is not matched, the common information acquired from only the first internal navigation application would be provided as the common information to the template 115. Of course, it was not illustrated, but it could be a second internal navigation application or other internal navigation applications, as the case may be. At the time, information acquired from the electronic device of the vehicle to be inputted to the internal applications could be matched and then the matched common information acquired from the internal applications also could be provided to the template 115.

In addition, information classified into the specialized information among pieces of information acquired from the internal application connected with the template and the external applications could be also matched and provided to the template 115. The matched specialized information could be mainly traffic information or point of interest (POI) information which is not included as information on the internal application. At the time, the specialized information could be matched after being filtered, as the case may be.

Figure 5:
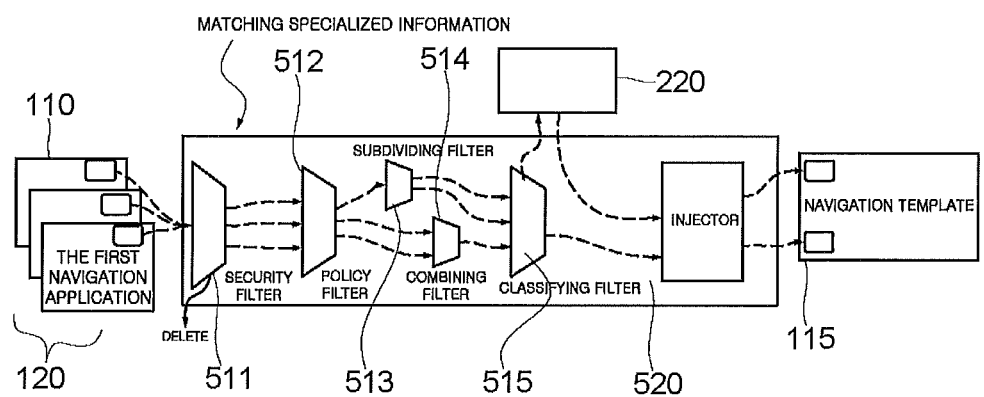
FIG. 5 is a drawing exemplarily showing a configuration of filtering specialized information inputted from multiple applications in accordance with an example embodiment of the present invention.

FIG. 5 exemplarily shows a configuration of filtering the specialized information inputted from multiple applications in accordance with one example embodiment of the present invention.

By referring to FIG. 5, the matching managing part 220 in accordance with one example embodiment of the present invention may select and match the specialized information among the multiple pieces of specialized information acquired from the internal application 110 and the external applications 120 by performing filtering process in use of at least one of a variety of filtering modules, including a security filter 511, a policy filter 512, a subdividing filter 513, a combining filter 514, a classifying filter 515, etc.

More specifically, by referring to FIG. 5, the security filter 511 may perform a function of removing the specialized information that does not meet the predefined security standard by a vehicle maker, etc. and the policy filter 512 may perform a function of removing the specialized information that does not meet a policy already set by the vehicle maker, etc. The subdividing filter 513 or the combining filter 514 may perform a function of subdividing different types of pieces of the specialized information or combining the same type of pieces of the specialized information while the classifying filter 515 may perform a function of cancelling a certain specialized information which has been determined to be the common information through the subdividing filter 513 or the combining filter 514 as explained above and transmitting the certain specialized information to the matching managing part 220 as described above. Surely, filtering is not limited to this. For example, the specialized information could be also filtered by adding another filter. Of course, the filtering task could not be essentially necessary.

In accordance with one example embodiment of the present invention, the matching managing part 220 may further include an injector 520 to allow the matched common information and the filtered and matched specialized information to be delivered to the template 115 of the head unit 200 of the vehicle and to be displayed.

Figure 6:
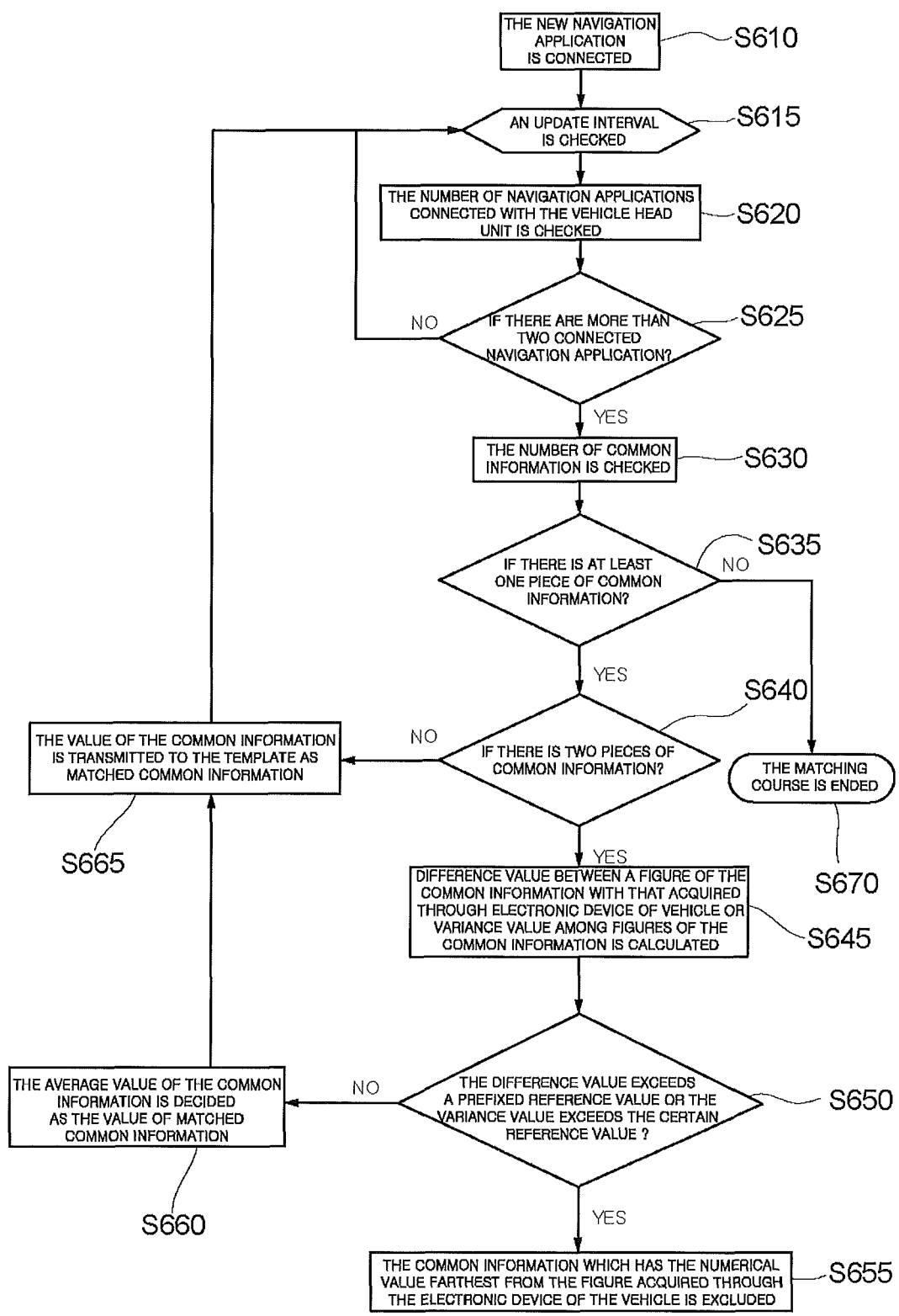
FIG. 6 is a drawing exemplarily showing a configuration of matching common information inputted from multiple applications in accordance with an example embodiment of the present invention.
Figure 7:
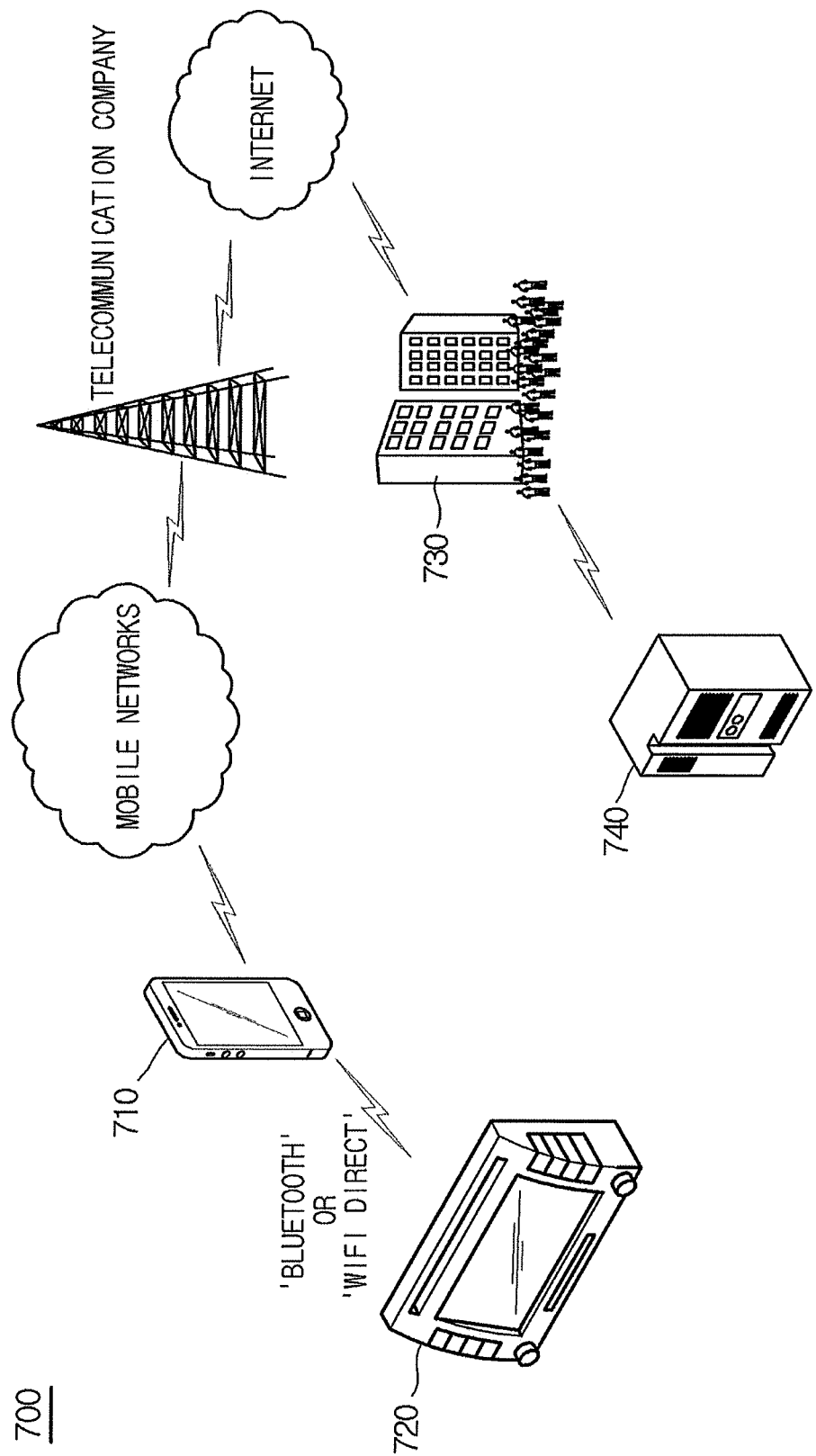
FIG. 7 is a diagram illustrating a method for providing information to a navigation system according to the conventional technology.

Next, FIG. 6 exemplarily shows a configuration of matching the common information inputted from multiple applications in accordance with one example embodiment of the present invention. By referring to FIG. 6, it could be assumed that the new navigation application is connected with the head unit 200 at a step of S610 and in such a case, an update interval for the matched common information could be checked at a step of S615.

Continuously, by referring to FIG. 6, after checking the number of navigation applications connected with the head unit 200 at steps of S620 and S625, if there are less than two connected navigation applications, the matching course is ended and is returned to the step of S615 to check the update interval again and if there are two or more connected navigation applications, the matching course may continue to proceed.

Continuously, by referring to FIG. 6, after checking the number of pieces of common information in the same type entered from the two or more navigation applications at steps of S630, S635, and S640, if there is less than one piece of common information, the matching course is ended at a step of S670; if there is one piece of common information, the value of the common information is immediately transmitted to the template 115 of the head unit 200 as matched common information at a step of S665; and if there are two or more pieces of common information, the matching course may continue to proceed at a step of S645.

Furthermore, on reference to FIG. 6, by referring to information on difference value comparing respective figures of multiple pieces of common information classified in the same type with a figure acquired through electronic device of the vehicle, difference value comparing an average figure of the multiple pieces of common information classified in the same type with the figure acquired therethrough or variance value among figures of multiple pieces of common information classified in the same type S645, if the difference value is less than a prefixed reference value or if the variance value is less than a certain reference value S650, the average value of the multiple pieces of common information could be decided as the matched common information S660 and if the difference value exceeds a prefixed reference value or the variance value exceeds the certain reference value S650, the common information which has the numerical value farthest from the figure acquired through the electronic device(s) of the vehicle could be excluded. Even though not being illustrated in FIG. 6, after the common information with the farthest value is excluded S655, the step of S645 could be performed again.

Even though not being illustrated in FIG. 6, the step could also be similarly performed for the multiple pieces of specialized information classified in the same type. Because there is a low possibility that there is a figure acquired from the electronic device(s) of the vehicle, if the variance value among figures of multiple pieces of the specialized information classified in the same type is less than the predetermined variance value, an average value of the multiple pieces of the specialized information could be decided as the matched specialized information and if the variance value exceeds the predetermined variance value, the specialized information with the farthest value from the average value could be excluded.

As explained above, common information (e.g., direction, speed, distance, etc.) relating to driving of a vehicle can be provided more accurately through the template 115 of the head unit 200 by matching a variety of pieces of common information inputted from multiple navigation applications.

A matching algorithm used for matching the common information in accordance with the present invention is not limited to the case as mentioned above, and it is made clear that the matching algorithm could be changed within the scope of being able to achieve the purpose of the present invention.

In accordance with the present invention, as a variety of pieces of information inputted from multiple internal and external navigation applications could be matched in a diversity of versions depending on modes, more accurate and more diverse pieces of information could be provided for a vehicle user compared to conventional navigation applications.

Besides, since a certain matching method is selected among a plurality of matching methods for matching information obtained from electronic devices of the vehicle and that inputted from applications of a mobile terminal(s), optimized information fit for a driving condition of the vehicle or a purpose of a use of the application can be provided to a driver of the vehicle of a passenger thereof.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

In accordance with the present invention, the components of the interoperated template could be automatically changed among templates stored in the head unit by comparing the driving speed of the vehicle and the preset reference speed and referring to the information on the application acquired from the mobile terminal.

The present invention allows the driver as the user of the vehicle with the passenger(s) to concentrate on driving depending on the driving speed of the vehicle and this may cause the safety of the vehicle to be improved because the user could drive the vehicle more safely by receiving less information unnecessary for driving and more information necessary therefor and this may reduce the traffic accident risk.

What is claimed is:

1. A method for integrating information on at least one external application stored in a mobile terminal connected with a head unit of a vehicle with information on at least one internal application built in the head unit of the vehicle and providing the integrated information by using a template-based user interface, comprising steps of:
  (a) classifying respective pieces of information inputted from at least one internal application belonging to a specific category among all the internal applications connected with a template of the head unit and information inputted from at least one external application belonging thereto among all the external applications connected therewith into either common information or specialized information;
  (b) deciding whether common information of the external application belonging to the specific category should be matched with that of the internal application belonging thereto by referring to a matching algorithm under a matching method, if being selected among (i) a full coordination matching method for matching the common information of the external application belonging to the specific category with that of the internal application belonging thereto and matching the specialized information of the external application belonging thereto with that of the internal application belonging thereto, (ii) a partial coordination matching method for requesting information on a selection of a user of the vehicle to be inputted as a condition for matching the common information of the external application belonging thereto with that of the internal application belonging thereto and matching the specialized information of the external application belonging thereto with that of the internal application belonging thereto, and (iii) a no coordination matching method for not matching the common information of the external application belonging thereto with that of the internal application belonging thereto and matching the specialized information of the external application belonging thereto with that of the internal application belonging thereto and matching the common information of the external application belonging thereto with that of the internal application belonging thereto, if necessary, and matching the specialized information of the external application belonging thereto with that of the internal application belonging thereto; and (c) providing common information at states of being matched or unmatched according to the matching algorithm through the template and the matched specialized information through the template.

2. The method of claim 1, wherein one among (i) the full coordination matching method, (ii) the partial coordination method, and (iii) the no coordination matching method is selected by referring to policy information of the vehicle regarding applications belonging to the specific category.

3. The method of claim 1, wherein the common information is preset by a maker of the head unit.

4. The method of claim 1, wherein the specialized information is the other information excluding the common information inputted from the internal application and the external one.

5. The method of claim 1, wherein the internal application and the external one belonging to the specific category are navigation applications.

6. The method of claim 5, wherein the common information includes at least one piece of information on direction, speed, distance, location and time.

7. The method of claim 5, wherein the specialized information includes at least one piece of information on traffic volume, GPS accuracy, lanes, map shape, and view modes.

8. The method of claim 1, wherein the step of (b) includes the steps of:
(b1) classifying the multiple pieces of common information depending on types of pieces of information if matching the common information is necessary and classifying the multiple pieces of specialized information depending on types of pieces of information; and
(b2) deciding average value of the multiple pieces of common information as the matched common information if difference value comparing respective figures of multiple pieces of common information classified in the same type with a figure acquired through electronic device of the vehicle or difference value comparing an average figure of the multiple pieces of common information classified in the same type with the figure acquired therethrough less than a prefixed reference value or if variance value among figures of multiple pieces of common information classified in the same type is less than a certain reference value, and deciding average value of the multiple pieces of specialized information as the matched specialized information if variance value among figures of multiple pieces of specialized information classified in the same type is less than a predetermined reference value by referring to one of the difference values or the variance value.

9. The method of claim 1, wherein the multiple pieces of specialized information are matched under one of (i) the full coordination matching method, (ii) the partial coordination matching method and (iii) the no coordination matching method after the multiple pieces of specialized information are filtered by using at least one of a security filter, a policy filter, a subdividing filter, an combining filter, and a classifying filter.

10. The method of claim 1, wherein the steps of (a) through (c) are performed whenever a predecided time interval elapses or a predefined event occurs.

11. A head unit for integrating information on at least one external application stored in a mobile terminal with that on at least one built-in internal application, and providing the integrated information by using a template-based user interface, comprising:
an application information classifying part for classifying respective pieces of information inputted from at least one internal application belonging to a specific category among all the internal applications connected with a template of the head unit and information inputted from at least one external application belonging thereto among all the external applications connected therewith into either common information or specialized information;
a matching managing part for deciding whether common information of the external application belonging to the specific category should be matched with that of the internal application belonging thereto by referring to a matching algorithm under a matching method, if being selected among (i) a full coordination matching method for matching the common information of the external application belonging to the specific category with that of the internal application belonging thereto and matching the specialized information of the external application belonging thereto with that of the internal application belonging thereto, (ii) a partial coordination matching method for requesting information on a selection of a user of the vehicle to be inputted as a condition for matching the common information of the external application belonging thereto with that of the internal application belonging thereto and matching the specialized information of the external application belonging thereto with that of the internal application belonging thereto, and (iii) a no coordination matching method for not matching the common information of the external application belonging thereto with that of the internal application belonging thereto and matching the specialized information of the external application belonging thereto with that of the internal application belonging thereto and matching the common information of the external application belonging thereto with that of the internal application belonging thereto, if necessary, and matching the specialized information of the external application belonging thereto with that of the internal application belonging thereto; and
a display managing part for providing common information at states of being matched or unmatched according to the matching algorithm through the template and the matched specialized information through the template.

12. The head unit of claim 11, wherein one of (i) the full coordination matching method, (ii) the partial coordination method, and (iii) the no coordination matching method is selected by referring to policy information of the vehicle regarding applications belonging to the specific category.

13. The head unit of claim 12, wherein the common information classified by the application information classifying part is information preset by its maker.

14. The head unit of claim 12, wherein the specialized information classified by the application information classifying part is the other information excluding the common information inputted from the internal application and the external one.

15. The head unit of claim 12, wherein information classified by the application information classifying part is inputted from internal and external navigation applications belonging to the specific category.

16. The head unit of claim 15, wherein the common information classified by the application information classifying part includes at least one piece of information on direction, speed, distance, location and time.

17. The head unit of claim 15, wherein the specialized information classified by the application information classifying part at least one piece of information on traffic volume, GPS accuracy, lanes, map shape, and view modes.

18. The head unit of claim 12, wherein the application information classifying part classifies the multiple pieces of common information depending on types of pieces of information if matching the common information is necessary and classifying the multiple pieces of specialized information depending on types of pieces of information; and the matching managing part decides average value of the multiple pieces of common information as the matched common information if difference value comparing respective figures of multiple pieces of common information classified in the same type with a figure acquired through electronic device of the vehicle or difference value comparing an average figure of the multiple pieces of common information classified in the same type with the figure acquired therethrough is less than a prefixed reference value or if variance value among figures of multiple pieces of common information classified in the same type is less than a certain reference value, and decides average value of the multiple pieces of specialized information as the matched specialized information if variance value among figures of multiple pieces of specialized information classified in the same type is less than a predetermined reference value by referring to one of the difference values or the variance value.

19. The head unit of claim 12, wherein the matching managing part matches the multiple pieces of specialized information under one of (i) the full coordination matching method, (ii) the partial coordination matching method and (iii) the no coordination matching method after filtering the multiple pieces of specialized information by using at least one of a security filter, a policy filter, a subdividing filter, an combining filter, and a classifying filter.

20. One or more computer-readable recording media having stored thereon a computer program that, when executed by one or more processors, causes the one or more processors to perform acts including:

(a) classifying respective pieces of information inputted from at least one internal application belonging to a specific category among all the internal applications connected with a template of the head unit and information inputted from at least one external application belonging thereto among all the external applications connected therewith into either common information or specialized information;

(b) deciding whether common information of the external application belonging to the specific category should be matched with that of the internal application belonging thereto by referring to a matching algorithm under a matching method, if being selected among (i) a full coordination matching method for matching the common information of the external application belonging to the specific category with that of the internal application belonging thereto and matching the specialized information of the external application belonging thereto with that of the internal application belonging thereto, (ii) a partial coordination matching method for requesting information on a selection of a user of the vehicle to be inputted as a condition for matching the common information of the external application belonging thereto with that of the internal application belonging thereto and matching the specialized information of the external application belonging thereto with that of the internal application belonging thereto, and (iii) a no coordination matching method for not matching the common information of the external application belonging thereto with that of the internal application belonging thereto and matching the specialized information of the external application belonging thereto with that of the internal application belonging thereto and matching the common information of the external application belonging thereto with that of the internal application belonging thereto, if necessary, and matching the specialized information of the external application belonging thereto with that of the internal application belonging thereto; and (c) providing common information at states of being matched or unmatched according to the matching algorithm through the template and the matched specialized information through the template.

* * * * *